(12) United States Patent
Schmal et al.

(10) Patent No.: US 8,431,203 B2
(45) Date of Patent: Apr. 30, 2013

(54) HIGH TEMPERATURE COOKING BAG FOR PACKAGING AND COOKING WHOLE MUSCLE MEAT PRODUCTS

(75) Inventors: Michael D. Schmal, Orwigsburg, PA (US); Ernest E. Bachert, Orwigsburg, PA (US)

(73) Assignee: M & Q IP Leasing, Inc., Wilmington, DE (US)

( * ) Notice: Subject to any disclaimer, the term of this patent is extended or adjusted under 35 U.S.C. 154(b) by 954 days.

(21) Appl. No.: 12/233,319

(22) Filed: Sep. 18, 2008

(65) Prior Publication Data

US 2009/0080812 A1    Mar. 26, 2009

Related U.S. Application Data

(60) Provisional application No. 60/973,961, filed on Sep. 20, 2007.

(51) Int. Cl.
| | |
|---|---|
| B32B 1/02 | (2006.01) |
| B32B 27/08 | (2006.01) |
| B32B 27/34 | (2006.01) |
| B32B 27/36 | (2006.01) |

(52) U.S. Cl.
USPC .......... 428/35.7; 428/474.4; 428/474.7; 428/474.9; 428/475.2; 428/480

(58) Field of Classification Search .......... 428/411.1, 428/474.4, 474.7, 474.9, 475.2, 480, 35.7
See application file for complete search history.

(56) References Cited

U.S. PATENT DOCUMENTS

| | | | |
|---|---|---|---|
| 4,915,963 A | 4/1990 | Lustig et al. | |
| 5,498,432 A | 3/1996 | Leu | |
| 2002/0182352 A1 | 12/2002 | Mitten et al. | |
| 2004/0048086 A1 | 3/2004 | Kennedy et al. | |
| 2005/0222329 A1 | 10/2005 | Shah | |

FOREIGN PATENT DOCUMENTS

JP    2001-253032    *  9/2001

OTHER PUBLICATIONS

Machine Translation of JP 2001-253032.*
ISR for PCT/US08/76960, Dec. 4, 2008.

* cited by examiner

*Primary Examiner* — Erik Kashnikow
(74) *Attorney, Agent, or Firm* — Pepper Hamilton LLP (57) ABSTRACT

High temperature bags for use in high temperature processes. Suitable high temperature processes include cooking food products, such as whole muscle meats, and sterilization of medical instruments. The high temperature bags may be comprised of multilayer films comprising materials that can withstand high temperatures and also have other beneficial properties such as, for example, the ability to be readily heat sealed, durability, no adhesion to food products, and good/improved moisture and gas barrier properties. These high temperature bags can preferably withstand temperatures greater than the boiling point of water, i.e., 212° F., more preferably greater than 300° F. and more even more preferably greater than 350° F. Furthermore, the high temperature bags may be used to freeze and ship products and may be placed directly into a high temperature environment, such as an oven or microwave, in order to cook or sterilize a product contained within the bag.

25 Claims, 8 Drawing Sheets

HIGH TEMPERATURE COOKING BAG FOR PACKAGING AND COOKING WHOLE MUSCLE MEAT PRODUCTS

CROSS REFERENCE TO RELATED APPLICATIONS

This application claims the benefit of U.S. Application 60/973,961 filed Sep. 20, 2007, the disclosure of which is being incorporated herein by reference in its entirety.

TECHNOLOGY FIELD

The present invention relates generally to bags used for high temperature processes, and more particularly to bags that can be used to package products for storage and high temperature applications. This technology is particularly suited, but by no means limited, for use in high temperature food cooking applications.

BACKGROUND

Cooking food products such as whole muscle meats in cooking bags has recently gained popularity. Traditional cooking bags can be generally categorized into two groups. The first group includes cooking bags used to cook meats at temperatures primarily below the boiling point of water, i.e., less than 212° F. These bags are usually multi-layered and consist of polyethylene, either co-extruded or laminated, with other barrier type polymers such as nylon, ethylene-vinyl alcohol (EVOH), or polyester. They are relatively easy to heat seal because they are sealed using a polyethylene heat seal layer which has a low melt point. This low melt point, however, leads to other drawbacks. First, cooking at a temperature above the melt point leads to degradation/failure of the bag and destruction of the food product being cooked. Furthermore, Food and Drug Administration regulations require that cooking of food products in these materials be performed in temperatures below the boiling point of water. Accordingly, the cooking range for these bags is typically between 180° F. and 210° F.

The second group of cooking bags are high temperature cooking bags. These bags usually consist of a single layer of film comprising either 100% nylon or 100% oriented polyester. Typically the film is very thin, i.e., about 1 mil thick. The drawbacks of these products are numerous. First, they are not readily heat sealable as it is extremely difficult to get a good hermetic seal at a meat packing plant with films comprising 100% nylon or 100% oriented polyester. Second, because the bags are so thin, they lack durability and can easily be torn or ripped during handling. Third, because these bags consist of a single layer film, they do not contain both good gas barrier properties and good moisture barrier properties. For example, nylon bags have good gas barrier properties but poor moisture barrier properties. Accordingly, nylon bags are not useful for long-term storage of non-frozen foods. Polyester bags, for example, have good moisture barrier properties, but less than optimal gas barrier properties. As such, products stored in polyester bags can be easily fouled by migration of undesired gases and odors into the bag.

A high temperature bag that can be used for high temperature processes above 212° F. is desirable. In addition, a multilayer film or a high temperature bag, having one or more of the following properties including readily heat sealed; durable enough to withstand handling during packaging, transport, and cooking; good gas barrier properties; and good moisture barrier properties would also be desirable. Furthermore, a multi-layer cooking bag that can be used for high temperature processes such as high temperature cooking of food products would also be desirable.

SUMMARY

Certain embodiments of the present invention are directed to a high temperature bag for use in a high temperature process comprising: a closed bottom end; at least one side wall extending upward from the closed bottom end; an open top end formed by distal ends of the at least one side wall; a cavity formed by the closed bottom end, the at least one side wall, and the open top end; wherein the high temperature bag comprises a multi-layered film, the multi-layered film comprising: an outer layer; an inner layer; wherein the high temperature bag is suitable for high temperature processes that occur at temperatures greater than about 210° F.

In one embodiment, the outer layer comprises a polyester blended with one of: a polyester elastomer or polyamide elastomer and the inner layer comprises one of: a polyester elastomer or a polyamide elastomer. In another embodiment the outer layer comprises a nylon blended with one of: a polyester elastomer or polyamide elastomer and the inner layer comprises one of: a polyester elastomer or a polyamide elastomer. In one embodiment, the inner layer includes 100% of polyester elastomer or a polyamide elastomer and the outer layer includes a nylon blended with a polyester elastomer or a polyamide elastomer. The blended outer layer may include at least about 75% nylon.

In another embodiment, the high temperature multi-layered film may further comprise a tie layer between the inner layer and the outer layer. The tie layer comprises at least a percentage of the material of the inner layer and at least a percentage of the materials of the outer layer. The tie layer may be disposed between and ties together (e.g., bonds) any two adjacent layers in a multi-layered film. In addition, adjacent layers may comprise a pure or homogenous layer, a blended layer, or another tie layer. In a preferred embodiment, the tie layer includes at least about 75% of a core material of an adjacent layer and less than about 25% of an elastometric material of the other adjacent layer.

In another embodiment, the high temperature bag may further comprise a tie layer between the inner layer and the outer layer, wherein the outer layer comprises a polyester elastomer or polyamide elastomer, the inner layer comprises one of: a polyester elastomer or a polyamide elastomer, and the tie layer comprises a polyester blended with one of: a polyester elastomer or polyamide elastomer.

In another embodiment, the high temperature bag may further comprise a tie layer between the inner layer and the outer layer, wherein the outer layer comprises nylon, the inner layer comprises one of: a polyester elastomer or a polyamide elastomer, and the tie layer comprises a nylon blended with one of: a polyester elastomer or polyamide elastomer.

In another embodiment, the high temperature bag may further comprise a fourth layer outside of the third layer and a fifth layer outside the fourth layer. The fourth layer may comprise a second tie layer. The second tie layer may be disposed between and connect the third layer and the fifth layer. The second tie layer may comprise at least a percent of the material of the third layer and at least a percent of the material of the fifth layer. The second tie layer may comprise at least about 75% by weight of a core material of an adjacent layer. The second tie layer may comprise less than about 25% by weight of an elastometric material of an adjacent layer.

For example, an exemplary high temperature bag may comprise: an inner layer comprising one of: a polyester elastomer or a polyamide elastomer; a tie layer comprising a nylon blended with one of: a polyester elastomer or a polyamide elastomer; a third layer comprising a nylon; a second tie layer comprising nylon blended with one of: a polyester elastomer or polyamide elastomer; and a fifth layer comprising a polyester elastomer or polyamide elastomer.

In another embodiment, the high temperature bag may further comprise a sixth layer between the fourth layer and the fifth layer. The sixth layer may comprise a third tie layer. The third tie layer may be disposed between and connect the fourth layer and the fifth layer. The third tie layer may comprise at least a percent of the material of the fourth layer and at least a percent of the material of the fifth layer. The third tie layer may comprise at least about 75% by weight of a core material of an adjacent layer. The third tie layer may comprise less than about 25% by weight of an elastometric material of an adjacent layer.

For example, an exemplary high temperature bag may comprise: an inner layer comprising one of: a polyester elastomer or a polyamide elastomer; a tie layer comprising a nylon blended with one of: a polyester elastomer or a polyamide elastomer; a third layer comprising a nylon; a second tie layer comprising nylon blended with one of: a polyester elastomer or polyamide elastomer; a third tie layer comprising polyester blended with one of: a polyester elastomer or a polyamide elastomer; and a fifth layer comprising a polyester elastomer or polyamide elastomer.

In another embodiment, the high temperature bag may further comprise a seventh layer connected outside the fifth layer. The seventh layer may comprise a polyester elastomer or a polyamide elastomer.

According to another aspect of the invention, adjacent layers of the multi-layered film may comprise a pure or homogenous layer, a blended layer, or another tie layer.

According to another aspect of the invention, the inner layer of the multi-layered film and an outer layer of the multi-layered film comprise the same material.

According to another aspect of the invention, the high temperature bag may further comprise a gusset formed in a bottom portion of the high temperature bag. The gusset may comprise the inner layer and the outer layer of the multi-layered film folded and adhered to one another. The inner layer and the outer layer of the multi-layered film may be heat sealed together.

In a preferred embodiment, the high temperature bag is suitable for high temperature processes that occur at temperatures greater than about 300° F. In a more preferred embodiment, the high temperature bag is suitable for high temperature processes that occur at temperatures greater than about 350° F. In another embodiment, the high temperature bag is suitable for high temperature processes that occur at temperatures between about 210° F. and about 400° F. In certain embodiments, the high temperature process is cooking. In other embodiments, the high temperature process is sterilization of medical instruments.

Certain embodiments of the present invention are directed to a multilayer film for use in high temperature processes comprising: an inner core layer; a second core layer; and a first tie layer between and connecting the inner core layer and the second core layer. The first tie layer may comprise: a core material homogeneously blended with an elastomer material, wherein the first tie layer comprises at least about 75% (by weight) of the core material. In one embodiment, the tie layer of the film wherein the tie layer comprises at least about 80% (by weight) of the core material. In yet another embodiment, the tie layer of the film wherein the tie layer comprises at least about 90% (by weight) of the core material. A tie layer may comprise less than 25% (by weight) of an elastomer material of an adjacent layer.

In another embodiment, the film comprises an inner core layer comprising 100% of a polyester elastomer or a polyamide elastomer, the second core layer comprises 100% polyester and the first tie layer core material comprises polyester blended with one of the following elastomer materials: polyester elastomer or polyamide elastomer. In another embodiment, the inner core layer comprises 100% of a polyester elastomer or a polyamide elastomer, the second core layer comprises 100% nylon and the first tie layer core material comprises nylon blended with one of the following elastomer materials: polyester elastomer or polyamide elastomer.

In one embodiment, the film further comprises: a third core layer, wherein the third core layer comprises 100% polyester elastomer or polyamide elastomer; and a second tie layer between the second core layer and the third core layer, the second tie layer comprising: a core material homogeneously blended with an elastomer material, wherein the second tie layer comprises at least about 75% (by weight) of the core material, wherein the second tie layer comprises nylon blended with one of the following elastomer materials: polyester elastomer or polyamide elastomer.

In another embodiment, the film further comprises: a second tie layer outside the second core layer, the second tie layer comprising: a core material homogeneously blended with an elastomer material, wherein the second tie layer comprises at least about 75% (by weight) of the core material, wherein the second tie layer comprises nylon blended with one of the following elastomer materials: polyester elastomer or polyamide elastomer; a third tie layer outside the second tie layer, the third tie layer comprising: a core material homogeneously blended with an elastomer material, wherein the second tie layer comprises at least about 75% (by weight) of the core material, wherein the third tie layer comprises polyester blended with one of the following elastomer materials: polyester elastomer or polyamide elastomer; and a third core layer outside the third tie layer, wherein the third core layer comprises 100% polyester.

In another embodiment, the film further comprises: a fourth core layer outside the third core layer, wherein the fourth core layer comprises 100% polyester elastomer or polyamide elastomer, wherein the fourth core layer and the inner core layer comprise the same material.

In another embodiment, the polyester of the film is an oriented polyester wherein the oriented polyester comprises polyester and polyester elastomer. In one embodiment, the amount of polyester elastomer is less than about 25% (by weight). In another embodiment, the amount of polyester elastomer is between about 5% to about 25% (by weight).

Certain embodiments of the present invention are directed to a high temperature bag wherein the thickness of the multilayer film is from about 0.5 mils to about 5 mils. In a preferred embodiment, the present invention is directed to a high temperature bag wherein the thickness of the multilayer film is from about 2 mils to about 4 mils.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention will become apparent from the following detailed description of the invention when considered in conjunction with the accompanying drawings. For the purpose of illustrating the invention, there is shown in the drawings embodiments that are presently preferred, it being understood, however, that the invention is not limited to the specific instrumentalities disclosed. In the drawings.

DETAILED DESCRIPTION OF ILLUSTRATIVE EMBODIMENTS

The present invention is directed to embodiments of multilayer films, and multilayer high temperature bags 10 for use in high temperature processes. Suitable high temperature processes include cooking food products, such as whole muscle meats, and sterilization of medical instruments. The high temperature bags are comprised of multilayer films comprising materials that can withstand high temperatures and may also have other beneficial properties such as the ability to be readily heat sealed, durability, good moisture barrier properties, and/or good gas barrier properties. As used herein, high temperature may be defined as able to withstand temperatures greater than the boiling point of water, i.e., 212° F. In accordance with preferred embodiments, high temperature bags can withstand temperatures greater than the boiling point of water, i.e., 212° F.; preferably greater than about 300° F.; and more preferably greater than about 350° F. When applied to packaging of food products, the present invention allows for food products to be cooked in the same package that they were packaged and stored in.

The bags according to certain embodiments may also be readily heat sealed on conventional heat seal equipment that exists in meat packing plants. Furthermore, the multi-layer bags may have better tear strength and puncture resistance than the traditional cooking bags and can be frozen and shipped with improved tear strength and puncture resistance. The bags of this invention may also have improved gas and/or moisture barrier properties over conventional single layer cooking bags.

The films for these high temperature cooking bags can be produced using any technology known to one skilled in the art of high temperature bag production. Suitable technologies include blown film technology (both mono-layer and co-extrusion), cast film technology (both mono-layer and co-extrusion), or biaxial orientation (double-bubble or tenter frame, mono-layer or co-extrusion). The films can be either shrink or non-shrink. Typical film thicknesses are from about 0.5 mils to about 5 mils. Preferably, film thicknesses are from about 2 mils to about 4 mils. Suitable bags produced from these films include flat bottom bags, round bottom bags, gusset bags, bags-on-tape, or wicket bags.

The high temperature multilayer films of the present invention may have an interior surface and an exterior surface. The interior surface is the portion of the high temperature multilayer that is in contact with the product. The exterior surface is the outside of the high temperature multilayer film.

Several materials may be used to construct high temperature films for use in high temperature bags. Suitable materials may have one, if not more, of the following characteristics. These characteristics include: high melting point, can be readily heat sealed, good tear strength/puncture resistance, can withstand being frozen, shipped, etc., and good barrier properties, such as gas and/or moisture barrier properties. Suitable materials include polyester elastomer, polyamide elastomer, nylon, polyester, and polypropylene.

One characteristic for a suitable material is good barrier properties such as gas and moisture. As used herein, a material with a suitable gas barrier property has an oxygen barrier transmission coefficient of approximately 30 cc/24 hr/100 in$^2$/mil. Preferably, the oxygen barrier transmission coefficient is at least approximately 10 cc/24 hr/100 in$^2$/mil. As used herein, a material with a suitable moisture barrier property has a water vapor barrier transmission coefficient of approximately 40 g/24 hr/100 in$^2$/mil. Preferably, the water vapor barrier transmission coefficient is approximately 10 g/24 hr/100 in$^2$/mil.

Another characteristic for a suitable material is a good tear strength. As used herein, a material with a good tear strength has a tear strength greater than about 50 g/mil. In a more preferred embodiment, a material with a good tear strength has a tear strength of greater than about 75 g/mil. A suitable material may also have a good tensile yield strength. As used herein, a material with a good tensile yield strength has a tensile yield strength of greater than approximately 2,000 psi. Preferably, the tensile yield strength is greater than approximately 2,500 psi. In certain embodiments, the tear strength, puncture resistance, and tensile yield strengths of the film are improved through the combination of multiple layers in a multi-layer film.

Another characteristic for a suitable material is one that substantially does not adhere to food products during or after the cooking of food products. As used herein, substantially does not adhere to food products may be defined as less than 5% weight of the food product sticking to the package.

Polyester elastomer is a high temperature polymer with a crystal melting point typically around 423° F. The material is also elastic and the elasticity of the polymer when blended or co-extruded with other materials improves package integrity. The elasticity adds impact strength, tear resistance, improves seal strength, improves tensile properties, increases the properties of the force needed to break the bag and improves bone puncture resistance. Furthermore, polyester elastomer does not stick to proteins found in whole muscle meat products. Polyester elastomer can be used as a layer by itself, or can be blended with other materials to form a layer. Suitable materials that can be blended with polyester elastomer include, polyester, polyamide elastomer, and nylon. Suitable polyester elastomers include ARNITEL®, ARNITEL® EM630, HYTREL®, and RITEFLEX®.

Polyamide elastomer is similar to polyester elastomer. Polyamide elastomer generally has a melt point around approximately 380 to 400° F. Polyamide elastomer can be used as a layer by itself, or can be blended with other materials to form a layer. Suitable materials that can be blended with polyamide elastomer include polyester, polyester elastomer, and nylon. Suitable polyamide elastomers include PEBAX® and PEBAX® 4033.

Homopolymer nylon is another suitable material for a layer within a high temperature multilayer film. Nylon has exceptional oxygen, carbon dioxide and nitrogen barrier properties. Accordingly, it can be used as a barrier layer in a film structure that will maintain a vacuum or could be used in a gas flush package.

Nylon can be used as a layer by itself, or can be blended with other materials to form a layer. Suitable materials that can be blended with nylon include, polyester, polyamide elastomer, and polyester elastomer. Suitable nylon includes AKULON®, AKULON® F136 C1 which is a nylon 6, ULTRAMID®, ULTRAMID B40 LN01 which is a nylon 6, ASCEND®, SOLUTIA 66J, which is a nylon 6,6 containing a heat stabilizer, and UTRAMID C33 which is a nylon 6,6/6 co-polymer.

In certain embodiments, heat stabilizers may be added to the nylon to improve its heat stability. Although nylon has a relatively high melt point, approximately 423° F., without the addition of a heat stabilizer, nylon will become brown and brittle at temperatures higher than approximately 325° F. Suitable heat stabilizers may include copper salts such as copper iodide, copper bromide, and copper acetate.

Another suitable material for high temperature films is polyester. Polyester has very good moisture barrier qualities. Suitable polyesters include VERSATRAY™ and VERSATRAY™ 12822.

Even more suitable is oriented polyester. Oriented polyester has improved barrier properties and also has shrink properties not found in non-oriented polyester. Furthermore, oriented polyester has a higher continuous use temperature than non-oriented polyester. Accordingly, oriented polyester may be used in high temperature processes up to 400° F. without any significant signs of crystallization or melting. Polyester may be more easily oriented if blended with a small amount of polyester elastomer. Suitable amounts of polyester elastomer range from about 5% to about 25% (by weight).

When producing multi-layers films, it is desirable to combine layers using a method that does not decrease the bags ability to be used for high temperature cooking. A suitable method to accomplish this is through the use of tie layers. A tie layer may be an intermediate layer between two layers of dissimilar materials. The tie layer is comprised of materials of the layers in which it is between. This composition facilitates good adhesion of the layers because each layer is attached to a layer comprised, at least in part, of like materials. For example, to join a polyester layer with a nylon layer, a tie layer comprising a polyester elastomer blended with nylon would be suitable.

In certain embodiments, layers comprise a blend of a base material, such as polyester or nylon, with an elastomer material such as polyester elastomer or polyamide elastomer. Preferably, the percentage of base material in a layer is at least about 75% (by weight). In other embodiments, the percentage of base material in a layer is at least about 80% (by weight). In other embodiments, the percentage of base material in a layer is at least about 90% (by weight).

Figure 1:
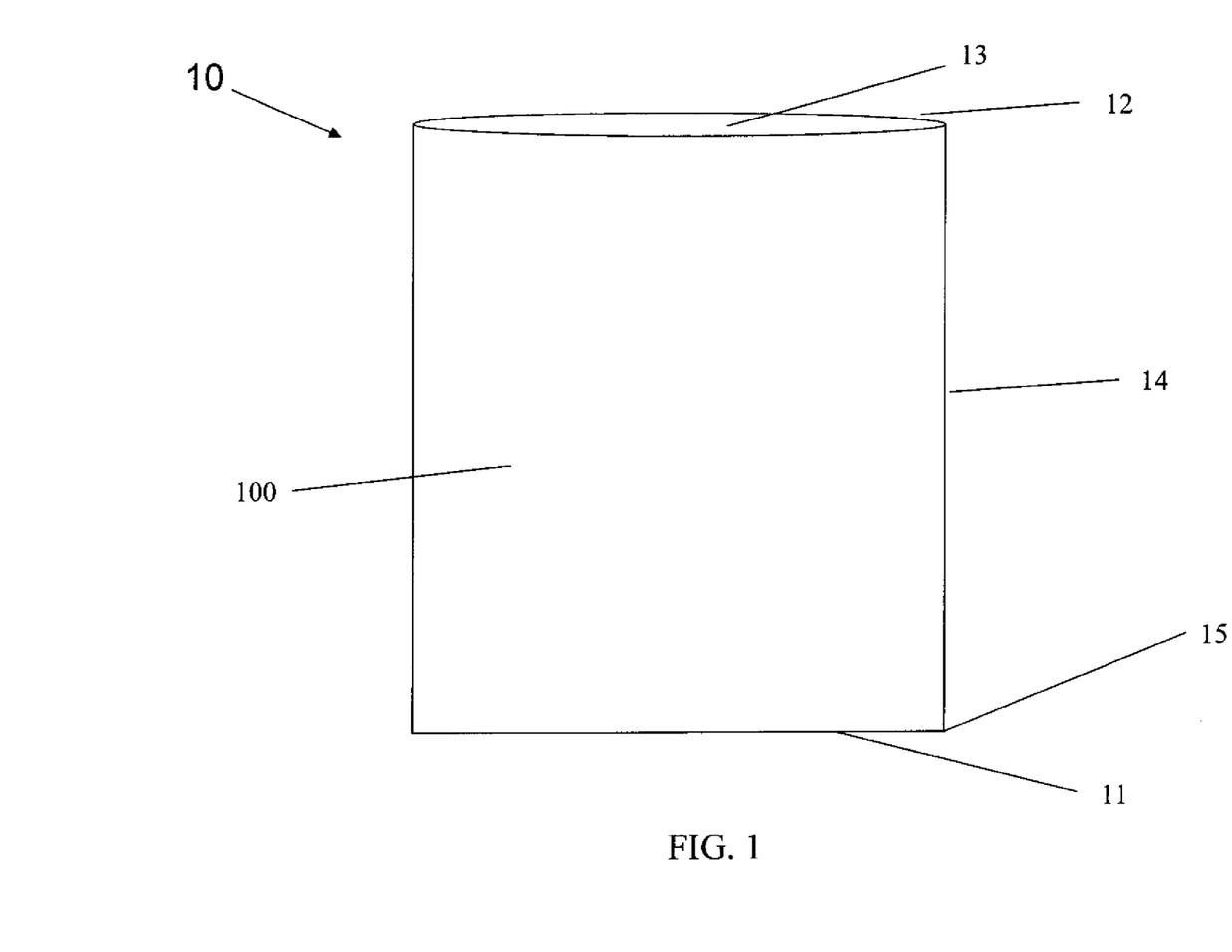
FIG. 1 is a front view of an exemplary high temperature cooking bag.

FIG. 1 shows an exemplary high temperature bag 10. The bag 10 is comprised of a high temperature film 100. As shown in FIG. 1, the bag may be comprised of a bottom 11, a distal end 12 comprising an opening 13, side walls 14 and corners 15.

Figure 2:
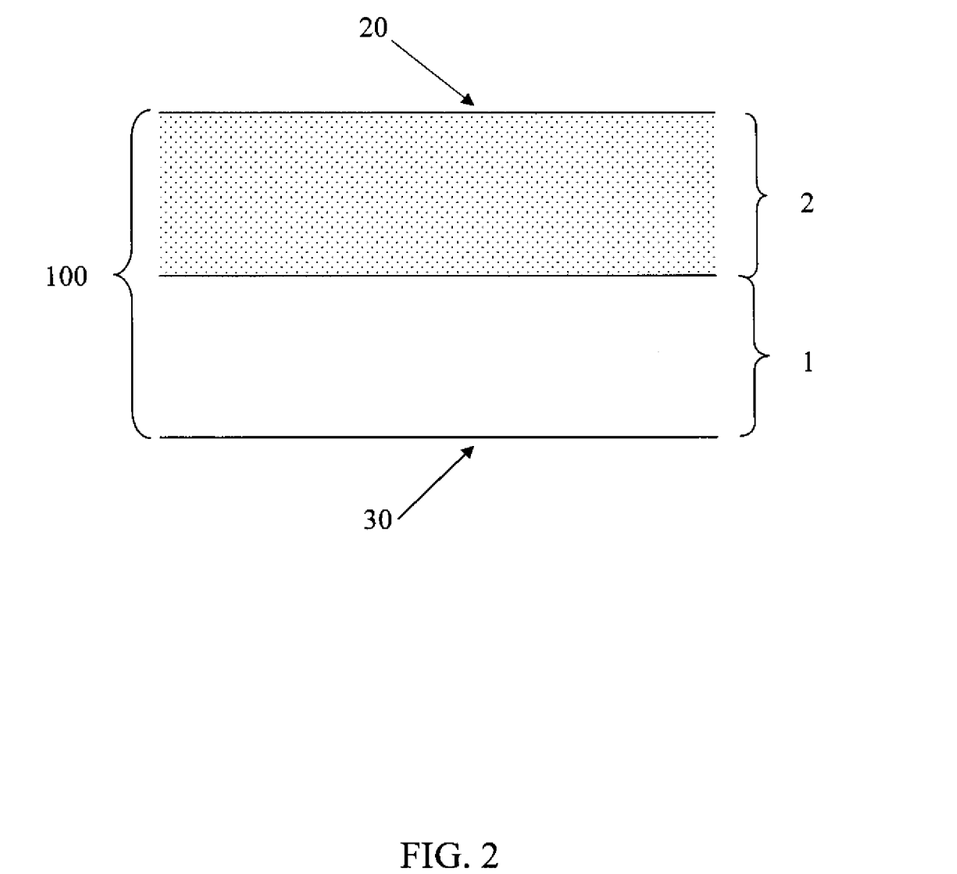
FIG. 2 is a cross sectional view of an exemplary multilayer film comprising two layers that may be used in the formation of a high temperature bag.

FIG. 2 is a cross sectional view of an exemplary multilayer film 100 that may be used in the formation of a high temperature bag 10. The multilayer film 100 comprises as exterior 20 and an interior 30. This figure shows a two layer structure including an inner layer 1 and an outer layer 2. Suitable materials for the inner layer 1 (inside of the bag) include a polyester elastomer or polyamide elastomer. The outer layer 2 of the film (outside of the bag) may be a blend of two materials.

Suitable materials for the outer layer 2 include a polyester blended with either polyester elastomer or polyamide elastomer. There are several advantages to this film structure. First, because the inside of the bag is a polyester or polyamide elastomer, it will not stick or will have reduced adhesion to meat proteins during cooking. Also, the elastomer content provides good puncture resistance. Furthermore, the polyester provides suitable moisture barrier properties. Finally, the polyester may be oriented. Orientation provides additional benefits including increased tear resistance and puncture resistance along with the ability for the bag to be shrinkable. Preferably, the elastomer material of the inner and the outer layers is the same.

Another suitable outer layer 2 comprises nylon blended with a polyester elastomer or polyamide elastomer. The benefits of this type of layer is that the outer layer 2 possesses some of the beneficial characteristics of a nylon layer, e.g., good gas barrier properties, and some of the beneficial characteristics of a polyester elastomer or polyamide elastomer layer, e.g., good flexibility. Furthermore, the polyester or polyamide elastomer in the polyester or polyamide elastomer/nylon blend of the outer layer 2 has an affinity for the polyester or polyamide elastomer inner layer 1. Suitable amounts of polyester or polyamide elastomer in the outer layer are less than about 25% (by weight). Preferably, the amount of polyester or polyamide elastomer is less than 20% (by weight). Preferably, the elastomer material of the inner and the outer layers is the same.

Figure 3:
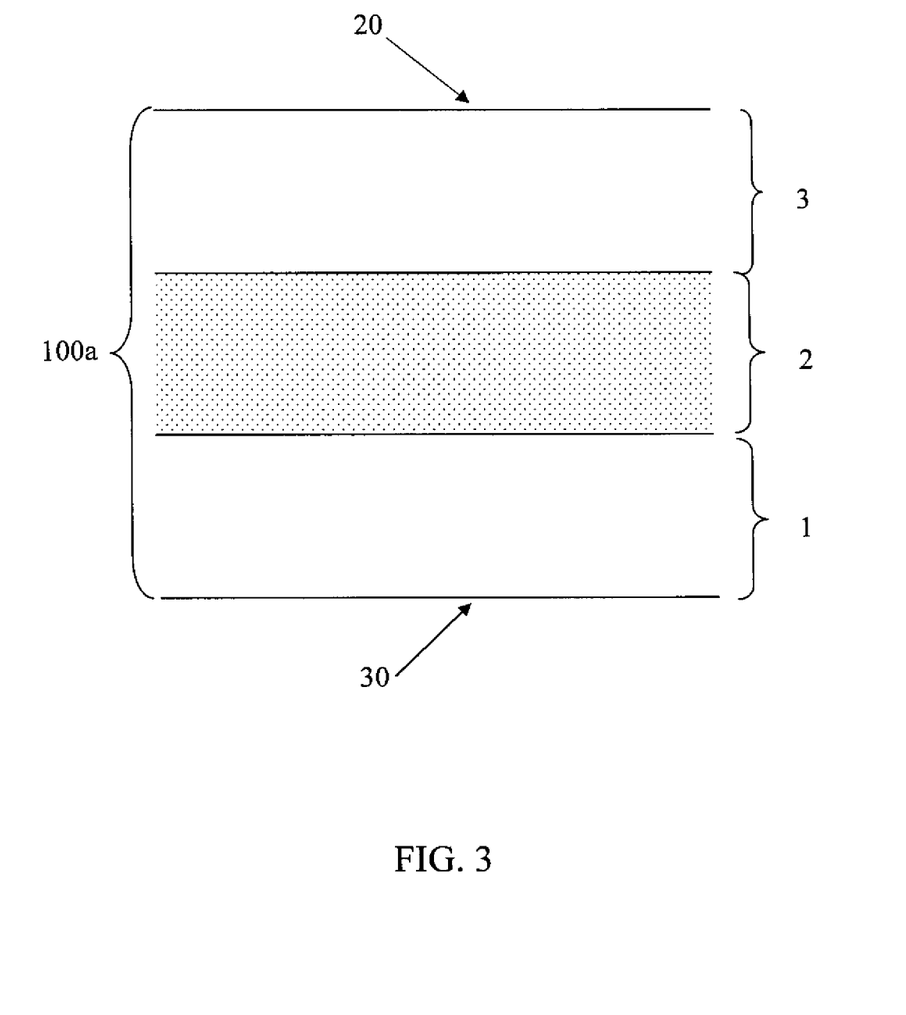
FIG. 3 is a cross sectional view of an exemplary multilayer film comprising three layers that may be used in the formation of a high temperature bag.

FIG. 3 is a cross sectional view of an exemplary multilayer film 100a that may be used in the formation of a high temperature bag 10. The multilayer film 100a comprises as exterior 20 and an interior 30. This figure shows a three layer structure comprising an inner layer 1, a second or tie layer 2, and a third layer 3. As shown in the embodiment of FIG. 3, the third layer may be an outer layer of the multilayer film. Suitable inner 1 layers include polyester elastomer or polyamide elastomer. Suitable third layers 3 include polyester elastomer, polyamide elastomer, polyester, or nylon. Suitable second or tie layers 2 include a polyester blended with a polyester elastomer or a polyamide elastomer; or a nylon blended with a polyester elastomer or polyamide elastomer. If the third layer comprises a polyester, then the tie layer preferably comprises a polyester blended with a polyester elastomer or polyamide elastomer. Alternatively, if the third layer comprises a nylon, then the tie layer preferably comprises a nylon blended with a polyester elastomer or polyamide elastomer.

In one embodiment, a high temperature bag 10 is comprised of a film 100a wherein the inner layer 1 comprises a polyester elastomer or polyamide elastomer, the third layer 3 comprises a polyester elastomer or polyamide elastomer, and the tie layer 2 comprises a polyester blended with a polyester elastomer or polyamide elastomer. The second layer 2 in the embodiment illustrated in FIG. 3 serves as a tie layer to adhere the inner layer 1 and outer layer 3. This embodiment wherein the inner layer 1 and the outer layer 3 comprise the same material is preferred for heat sealing gusseted bags (FIG. 8) because the inner and outer layers of the bag are the same and therefore readily adhered to one another where the bag is folded to form the gusset. Further benefits include good moisture barrier properties due to the presence of polyester in the film, reduced adhesion of meat products to the bag due to polyester elastomer or polyamide elastomer as an inner layer, and increased flexibility and durability because of the polyester or polyamide elastomer layers.

In another embodiment, a high temperature bag 10 is comprised of a film wherein the inner layer 1 comprises a polyester elastomer or polyamide elastomer, the outer layer 3 comprises nylon, and the second or tie layer 2 comprises a nylon blended with a polyester elastomer or polyamide elastomer. The second layer 2 in this embodiment serves as a tie layer to adhere the inner layer 1 and third or outer layer 3. The benefits of this structure include superior gas barrier properties due to the 100% nylon outer layer 3, improved heat seal qualities due to polyester elastomer or polyamide elastomer as an inner layer 1, reduced adhesion of meat products to the bag due to polyester elastomer or polyamide elastomer as an inner layer 1, and improved bone puncture resistance due to the presence of polyester elastomer and polyamide elastomer in the film.

Figure 4:
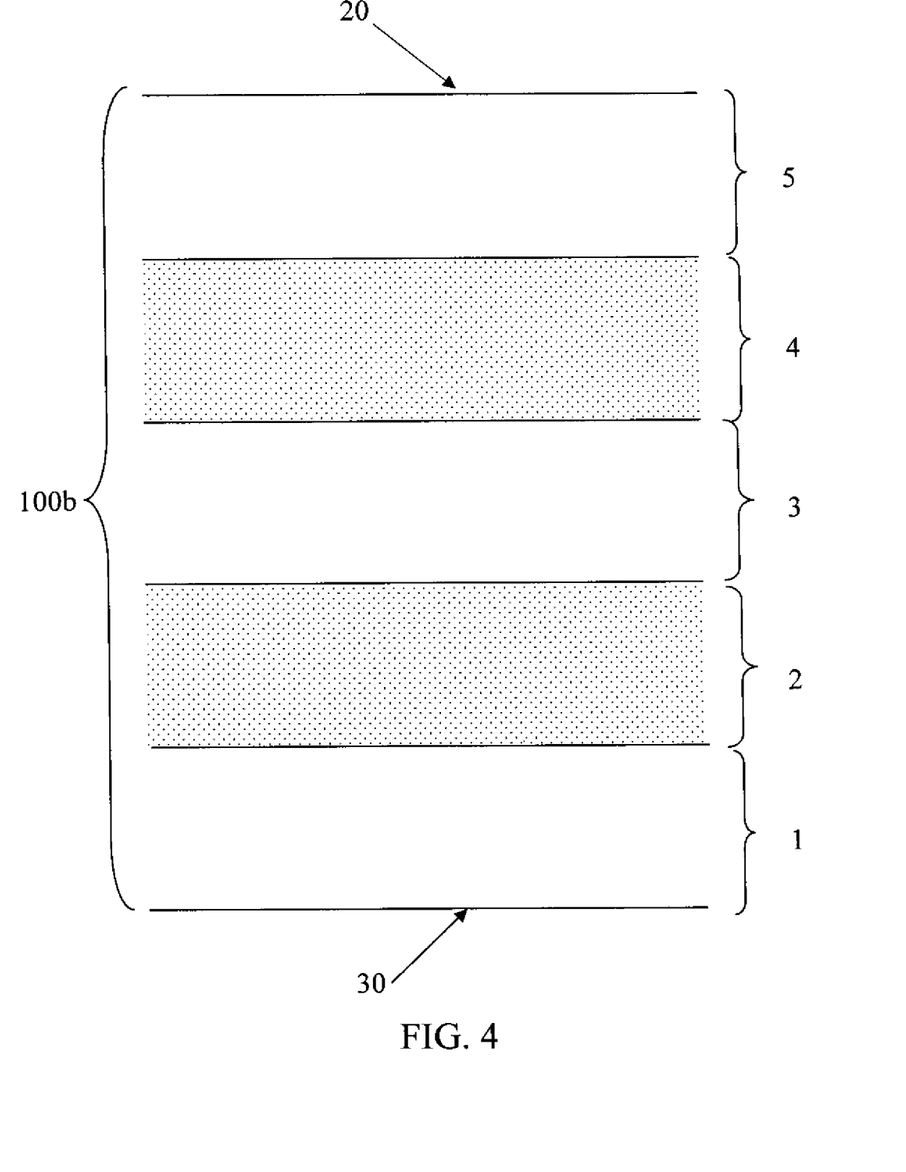
FIG. 4 is a cross sectional view of an exemplary multilayer film comprising five layers that may be used in the formation of a high temperature bag.

FIG. 4 is a cross sectional view of an exemplary multilayer film 100b that may be used in the formation of a high temperature bag 10. This figure shows a five layer structure comprising an inner layer 1, a second layer 2 outside the inner layer 1, a third layer 3 outside the second layer 2, a fourth layer 4 outside the third layer 3, and a fifth layer 5 outside the fourth layer 4. In one embodiment, a high temperature bag 10 may be comprised of a film 100b wherein the inner layer 1 and fifth or outer layers 5 are polyester elastomer or polyamide elastomer, the third layer 3 is nylon, and the second layer 2 and fourth layer 4 are nylon blended with a polyester elastomer or polyamide elastomer. As shown in FIG. 4, the first, third and fifth layers comprise core layers and the second and fourth layers comprise tie layers. This embodiment is preferred for heat sealing gusseted bags (FIG. 8) because the inner and outer layers 1, 5 of the bag include the same material and therefore readily adhered to one another where the bag is folded to form the gusset. Furthermore, when the inner and outer layers 1, 5 are comprised of polyester elastomer, they may be tied to the third or middle layer 3 of nylon by using tie layers 2, 4 of nylon and polyester elastomer. When the inner and outer layers 1, 5 are comprised of polyamide elastomer, they may be tied to the third or middle layer 3 of nylon by using a tie layer 2, 4 of nylon and polyamide elastomer. Alternatively, the third or middle layer 3 may comprise a polyester, and the two tie layers (i.e., the second layer 2 and the fourth layer 4) may comprise polyester and either polyester elastomer or polyamide elastomer depending on the material of the inner layer 1 and the fifth layer 5.

Figure 5:
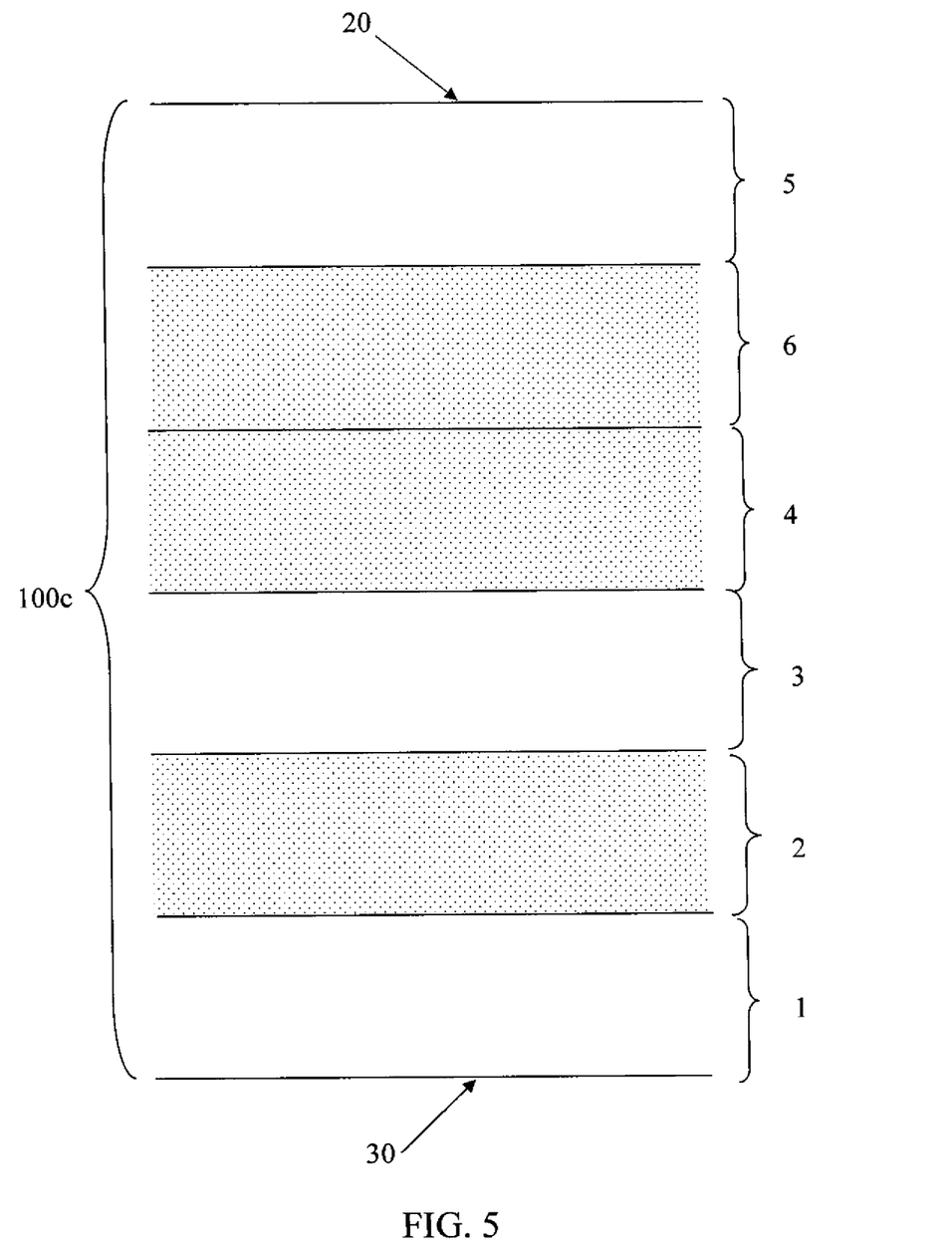
FIG. 5 is a cross sectional view of an exemplary multilayer film comprising six layers that may be used in the formation of a high temperature bag.

FIG. 5 is a cross sectional view of an exemplary multilayer film 100c that may be used in the formation of a high temperature bag 10. This figure shows a six layer structure comprising an inner layer 1, a second layer 2 outside the first layer 1, a third layer 3 outside the second layer 2, a fourth layer 4 outside the third layer 3, a fifth layer 5 outside the fourth layer 4, and a sixth layer 6 in between the fourth layer 4 and the fifth layer 5. As shown, the first, third and fifth layers comprise core layers and the second, fourth and sixth layers comprise tie layers. In one embodiment, a high temperature bag 10 is comprised of a film 100c wherein the inner layer 1 comprises polyester elastomer or polyamide elastomer, the fifth or outer layer 5 comprises polyester, the third layer 3 comprises nylon, the second layer or tie layer 2 comprises nylon blended with polyester elastomer or polyamide elastomer, the fourth layer or second tie layer 4 comprises nylon blended with a polyester elastomer or polyamide elastomer, and the sixth layer or third tie layer 6 comprises polyester blended with polyester elastomer or polyamide elastomer.

In this embodiment, a 100% polyester fifth or outer layer 5 may be tied together with a 100% nylon third layer 3 through two tie layers—i.e., a sixth or third tie layer 6 and a fourth or second tie layer 4. Using two contiguous tie layers to tie 100% nylon with 100% polyester provides a film with uncompromised barrier properties not possible with layers comprising nylon or polyester blended with other elastomers. To accomplish acceptable bonding between the fifth or outer layer 5 and third layer 3, the fourth or second tie layer 4 and the sixth or third tie layer 6 may both comprise the same elastomer. Thus, if the fourth or second tie layer 4 comprises nylon blended with polyester elastomer, the sixth or third tie layer 6 may comprise polyester blended with polyester elastomer. Conversely, if the fourth or second tie layer 4 comprises nylon blended with polyamide elastomer, the sixth or third tie layer 6 may comprise polyester blended with polyamide elastomer.

Figure 6:
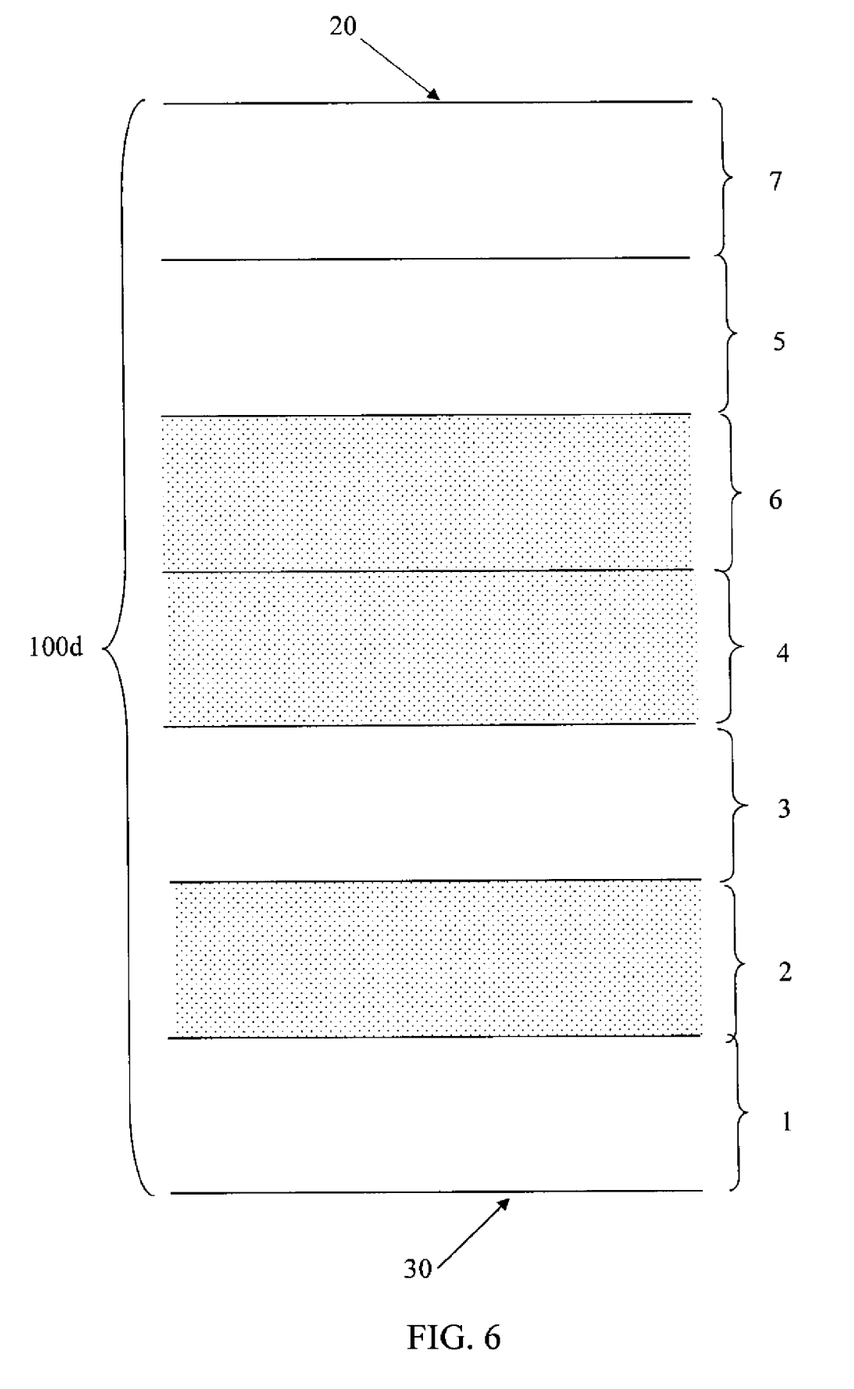
FIG. 6 is a cross sectional view of an exemplary multilayer film comprising seven layers that may be used in the formation of a high temperature bag.

FIG. 6 is a cross sectional view of an exemplary multilayer film 100d that may be used in the formation of a high temperature bag 10. This figure shows a seven layer structure comprising an inner layer 1, a second layer 2 outside of the first layer 1, a third layer 3 outside of the second layer 2, a fourth layer 4 outside of the third layer 3, a sixth layer 6 outside of the fourth layer 4, a fifth layer 5 outside of the sixth layer 6, and a seventh layer 7 outside of the fifth layer 5. As shown, the first, third, fifth and seventh layers comprise core layers, and the second, fourth and sixth layers comprise tie layers. In one embodiment, a high temperature bag 10 may be comprised of a film 100d wherein the inner layer 1 comprises a polyester elastomer or polyamide elastomer, the third layer 3 comprises nylon, the seventh layer 7 comprises a polyester elastomer or polyamide elastomer, the fifth layer 5 comprises polyester, the second (or tie) layer 2 comprises nylon blended with a polyester elastomer or a polyamide elastomer, the fourth (or second tie) layer 4 comprises nylon blended with a polyester elastomer or a polyamide elastomer, and the sixth (or third tie) layer 6 comprises polyester blended with a polyester elastomer or polyamide elastomer.

This embodiment is preferred for heat sealing gusseted bags (see e.g., FIG. 8) because the inner layer 1 and seventh (or outer) layer 7 of the bag 10 may be the same material and therefore readily adhered or heat seal to one another where the bag is folded to form the gusset. In addition to the benefit of heat sealing gusseted bags, this embodiment maintains all of the benefits of the disclosed embodiment for FIG. 5.

Figure 7:
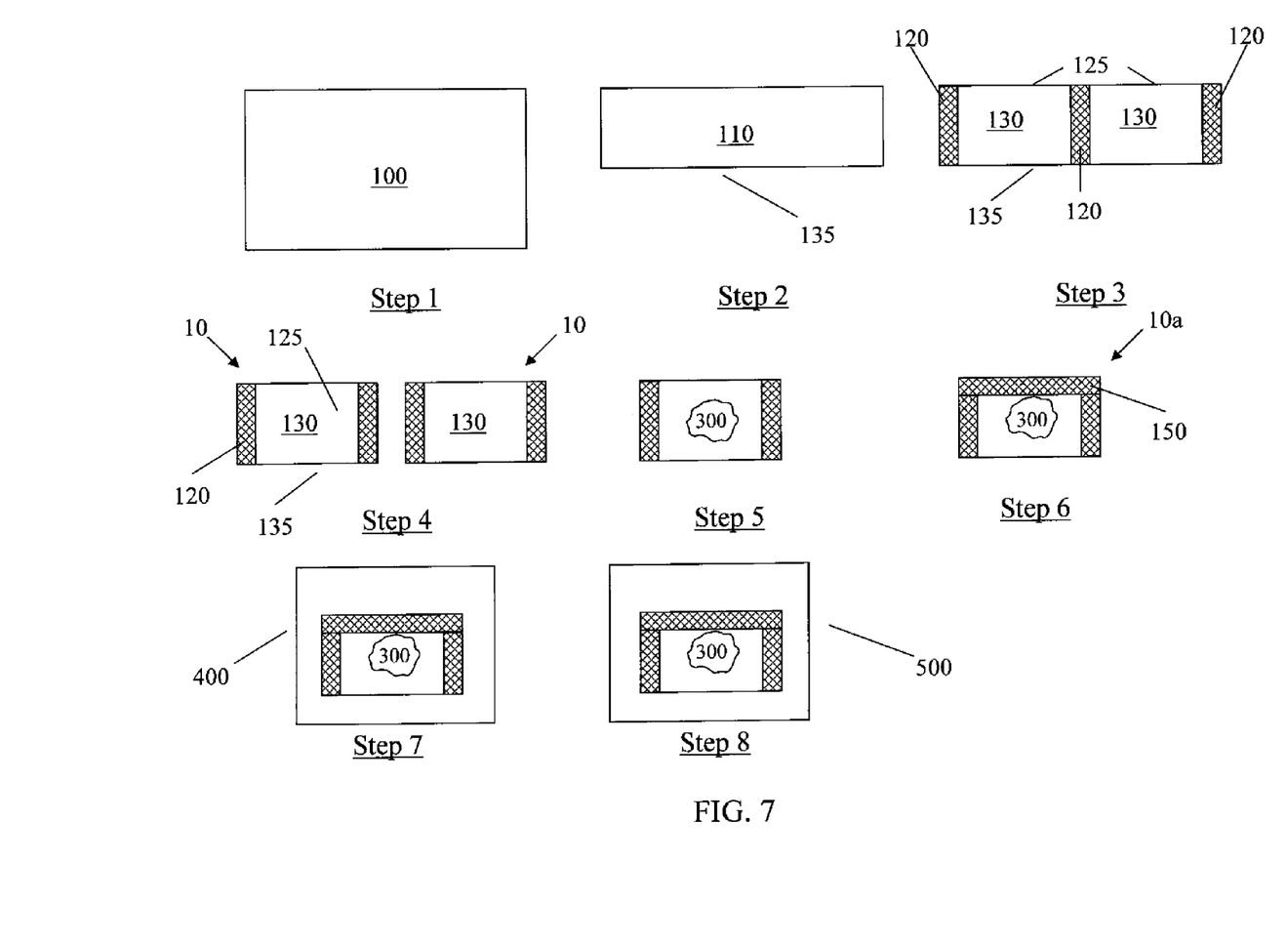
FIG. 7 is a flow chart of an exemplary method of making an exemplary high temperature bag formed from a multilayer film.

FIG. 7 is a schematic of an exemplary method of making a high temperature bag 10 formed from a multilayer film 100. As shown in FIG. 7, the high temperature bag 10 may be manufactured from a sheet of film 100—Step 1. The film may be folded over along, for example, its longitudinal length to form a folded sheet of film 110—Step 2. In an alternative embodiment (not shown) Step 1 may be performed by placing a first sheet of film flush with a second sheet of film. Step 2 may be performed by using a sealing device (not shown) to seal one edge of the two combined sheets.

A sealing device (not shown) may be used at Step 3 to seal one or more side edges 120, thereby forming high temperature bags 130. If the high temperature bag includes a contoured bottom edge (not shown), then the contoured bottom edge may also be formed by the sealing device during Step 3.

As such, in the illustrated embodiment a closed bottom 135 of the bag is formed from the folding of the film 100, portions of the contoured (optional) bottom edge 135 and closed side edges 120 may be formed from the heat sealing of the film. Other suitable techniques may be used to form the closed edges. The high temperature bag 10 includes an open top end 125. Adjacent high temperature bags may be separated from one another using a cutting device (not shown) that may cut down the center of a sealed edge 120 or cut between adjacent sealed edges—Step 4.

A product 300 may be introduced into the high temperature bag 10—Step 5. Suitable products include food products, surgical instruments, and the like. The high temperature bag 10 may subsequently be sealed 150 using a sealing device as discussed in step 3 or any other method to seal or close a bag—Step 6. The high temperature bag may include a closure system. For example, the closure system may include a flap portion combined with an adhesive wherein the flap portion may be folded over the opening in the bag and the adhesive closes and seals the bag opening. The adhesive may be disposed on the flap portion and/or the portion of the bag opposite the flap where the flap portion folds over. The adhesive may be covered by a non-adhesive covering (e.g. tape) that covers and protects the adhesive prior to use.

Alternatively, the oven bag closure system may include a high temperature zip lock closure or "slider" closure substantially near the top open end of the bag. Such a closure may be made out of a material such as nylon or polyester. In another example, the closure bag may include high temperature snap fasteners substantially near the top open end of the bag. Such snap fasteners may be welded on to a lip of the bag. The snaps may be made using well-known techniques in the art, such as injection molding the snaps out of nylon or polyester, for example.

The sealed bag 10a containing a product 300 may then be frozen or refrigerated in a freezer/refrigerator 400—Step 7, removed from the freezer or refrigerator and placed directly into a heating device, such as an oven 500—Step 8. Alternatively, the sealed bag containing a product may be removed from the freezer or refrigerator and may be defrosted in a microwave prior to being placed into a heating device such as an oven. Embodiments of the present invention allow for a product 300 to be sealed in a bag 10a, frozen or refrigerated 400 in that same bag, and placed into an oven 500 in that same bag.

Figure 8:
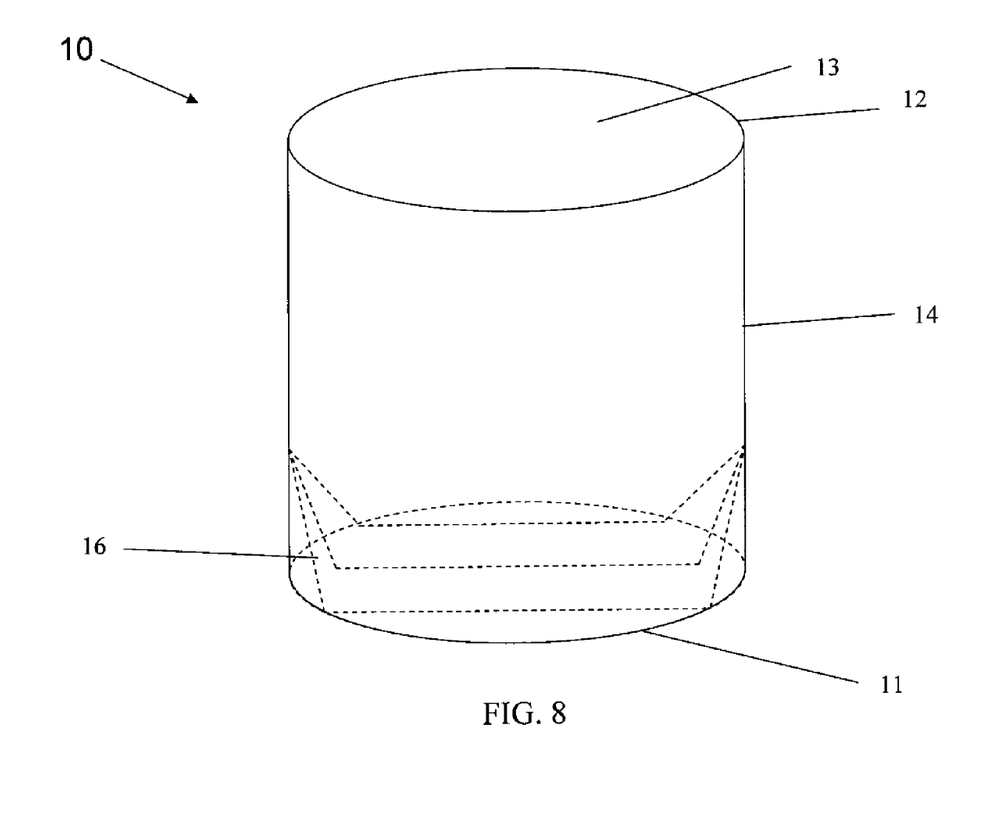
FIG. 8 is the front view of an exemplary gusseted high temperature cooking bag.

As shown in FIG. 8, the closed bottom end 135 may include a gusseted portion 16 which allows the high temperature bag 10 to stand-up on its own thereby making it easier to place a food product in the bag. For example, the gusseted portion 16 may be folded within the high temperature bag 10 proximate the closed bottom end 135. When the bag is fully opened, as depicted in FIG. 8, the gusseted portion 16 folds out and creates a base that allows the high temperature bag 10 to be free standing, so that a food product may be placed therein.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit of the invention.

What is claimed:

1. A multilayer film for use in high temperature processes comprising:
   an inner core layer consisting of 100% elastomeric material selected from polyester elastomer and polyamide elastomer;
   a second core layer consisting of either 100% elastomeric material selected from polyester elastomer and polyamide elastomer or 100% core material selected from nylon and polyester; and
   a first tie layer between and connecting the inner core layer and the second core layer, the first tie layer comprising a core material homogeneously blended with an elastomer material, wherein the core material of the first tie layer comprises at least about 75% (by weight) of the core material, and said core material is identical to that of the second core layer, when present.

2. The film of claim 1, wherein the first tie layer comprises at least about 80% (by weight) of the core material of the second core layer.

3. The film of claim 1, wherein:
   the second core layer consists of 100% polyester; and
   the first tie layer core material comprises polyester blended with one of the following elastomer materials: polyester elastomer or polyamide elastomer.

4. The film of claim 1, wherein:
   the second core layer consists of 100% nylon; and
   the first tie layer core material comprises nylon blended with one of the following elastomer materials: polyester elastomer or polyamide elastomer.

5. The film of claim 1, further comprising:
   a third core layer consisting of either 100% elastomeric material selected from polyester elastomer and polyamide elastomer or 100% core material selected from polyester or nylon; and
   a second tie layer between and connecting the second core layer and the third core layer, the second tie layer comprising a core material identical to that of the core material in either the second core layer or the third core layer homogeneously blended with an elastomer material, wherein the second tie layer comprises at least about 75% (by weight) of the core material.

6. The film of claim 5, wherein:
   the third core layer consists of 100% polyester elastomer or polyamide elastomer; and
   the second tie layer core material comprises nylon blended with one of the following elastomer materials: polyester elastomer or polyamide elastomer.

7. The film of claim 5, further comprising:
   a third tie layer between and connecting the second tie layer and the third core layer, the third core layer comprising a core material different from the core material of the second core layer, the third tie layer comprising a core material, identical to that of the third core layer, homogeneously blended with an elastomer material, wherein the core material of the third tie layer comprises at least about 75% (by weight) of the core material of the third core layer, such that the second tie layer and the third tie layer, together, connect the second core layer and the third core layer.

8. The film of claim 7, wherein:
   the second core layer consists of 100% nylon;
   the third core layer consists of 100% polyester;
   the second tie layer core material comprises nylon blended with one of the following elastomer materials: polyester elastomer or polyamide elastomer; and
   the third tie layer core material comprises polyester blended with one of the following elastomer materials: polyester elastomer or polyamide elastomer.

9. The film of claim 7, further comprising a fourth core layer outside and connected to the third core layer, the fourth core layer consisting of 100% polyester elastomer or polyamide elastomer.

10. The film of claim 9, wherein the fourth core layer and the inner core layer comprise the same material.

11. The film of claim 8, wherein the polyester of the third tie layer is an oriented polyester, wherein the oriented polyester comprises polyester and polyester elastomer.

12. The film of claim 11, wherein the amount of polyester elastomer is between 5% to about 25% (by weight).

13. The film of claim 1, wherein the film thickness is from about 2 mils to about 4 mils.

14. The film of claim 5, wherein the film thickness is from about 2 mils to about 4 mils.

15. The film of claim 7, wherein the film thickness is from about 2 mils to about 4 mils.

16. The film of claim 9, wherein the film thickness is from about 2 mils to about 4 mils.

17. A multilayer film for use in high temperature processes comprising:
    an inner core layer consisting of 100% elastomer material selected from polyester elastomer and a polyamide elastomer;
    a second core layer consisting of 100% elastomer material selected from polyester elastomer and a polyamide elastomer; and
    a first tie layer between and connecting the inner core layer and the second core layer, the first tie layer comprising a core material selected from polyester or nylon blended with an elastomer selected from polyester elastomer and polyamide elastomer.

18. The multilayer film of claim 17 wherein the inner core layer and the second core layer consist of identical elastomers.

19. The multilayer film of claim 17 wherein the core material of the first tie layer comprises polyester.

20. The multilayer film of claim 17 wherein the core material of the first tie layer comprises nylon.

21. A multilayer film for use in high temperature processes comprising:
    an inner core layer consisting of 100% elastomeric material selected from polyester elastomer and polyamide elastomer;
    a second core layer consisting of either 100% elastomeric material selected from polyester elastomer and polyamide elastomer or 100% core material selected from nylon and polyester; and
    a first tie layer between and connecting the inner core layer and the second core layer, the first tie layer comprising a core material homogeneously blended with an elastomer material, wherein the core material of the first tie layer comprises at least about 75% (by weight) of the core material, and said core material is identical to that of the second core layer, when present;
    a third core layer consisting of 100% polyester elastomer or polyamide elastomer; and
    a second tie layer between and connecting the second core layer and the third core layer, the second tie layer comprising at least about 75% of the same core material, when present, as the second core layer homogeneously blended with an elastomer material.

22. A multilayer film for use in high temperature processes comprising:
    an inner core layer consisting of 100% elastomeric material selected from polyester elastomer and polyamide elastomer;
    a second core layer consisting of 100% core material selected from nylon and polyester;
    a first tie layer between and connecting the inner core layer and the second core layer, the first tie layer comprising a core material homogeneously blended with an elastomer material, wherein the core material of the first tie layer comprises at least about 75% (by weight) of the core material, which is identical to that of the second core layer;
    a third core layer comprising a core material selected from polyester or nylon, which is different from that of the second core layer;
    a second tie layer between and connecting the second core layer and a third tie layer, the second tie layer comprising at least about 75% of the same core material as the second core layer homogeneously blended with an elastomer material;
    a third tie layer between and connecting the second tie layer and the third core layer, the third tie layer comprising at least about 75% of the same core material as the third core layer, homogeneously blended with an elastomer material.

23. The film of claim 22 wherein:
    the core material of the second core layer consists of 100% nylon;
    the core material of the third core layer consists of 100% polyester;
    the second tie layer comprises nylon blended with one of the following elastomer materials: polyester elastomer or polyamide elastomer; and
    the third tie layer comprises polyester blended with one of the following elastomer materials: polyester elastomer or polyamide elastomer.

24. A multilayer film for use in high temperature processes, the multilayer film comprising:
    an inner core layer consisting of 100% of a polyester elastomer or a polyamide elastomer;
    a second core layer consisting of 100% polyester; and
    a first tie layer between and connecting the inner core layer and the second core layer, the first tie layer core material comprising polyester blended with one of the following elastomer materials: polyester elastomer or polyamide elastomer.

25. A multilayer film for use in high temperature processes, the multilayer film comprising:
    an inner core layer consisting of 100% of a polyester elastomer or a polyamide elastomer;
    a second core layer consisting of 100% nylon; and
    a first tie layer between and connecting the inner core layer and the second core layer, the first tie layer core material comprising nylon blended with one of the following elastomer materials: polyester elastomer or polyamide elastomer.

* * * * *